(12) United States Patent
Chen

(10) Patent No.: US 6,817,451 B1
(45) Date of Patent: Nov. 16, 2004

(54) BRAKE SYSTEM FOR A RUNNING STROLLER

(76) Inventor: Hung-Tsun Chen, P.O. Box 697, Feng-Yuan City, Taichung Hsien (TW), 420

( * ) Notice: Subject to any disclaimer, the term of this patent is extended or adjusted under 35 U.S.C. 154(b) by 0 days.

(21) Appl. No.: 10/404,449

(22) Filed: Apr. 2, 2003

(51) Int. Cl.[7] ............................................... B62B 9/08
(52) U.S. Cl. ............................. 188/20; 188/19; 188/20; 188/29; 188/31; 280/647
(58) Field of Search ........................... 188/19, 20, 2 D, 188/2 F, 31, 57, 60, 2.65, 1.12; 280/47.38, 33.994, 647, 658

(56) References Cited

U.S. PATENT DOCUMENTS

| | | | |
|---|---|---|---|
| 4,116,464 A | * | 9/1978 | Haley .......................... 280/647 |
| 4,852,697 A | * | 8/1989 | Kulik .......................... 188/2 F |
| 5,046,748 A | * | 9/1991 | Oat-Judge ................. 280/47.34 |
| 5,370,408 A | * | 12/1994 | Eagan .................... 280/33.994 |
| 5,460,399 A | * | 10/1995 | Baechler et al. ............. 280/650 |
| 5,765,665 A | * | 6/1998 | Cheng et al. .................. 188/20 |
| 5,927,441 A | * | 7/1999 | Luo ............................. 188/19 |
| 6,022,042 A | * | 2/2000 | Hartenstine ................. 280/642 |
| 6,170,615 B1 | * | 1/2001 | Cheng ......................... 188/20 |
| 6,308,805 B1 | * | 10/2001 | Lan ............................. 188/20 |
| 6,443,468 B1 | * | 9/2002 | Eros ........................ 280/47.38 |

* cited by examiner

*Primary Examiner*—Matthew C. Graham
*Assistant Examiner*—Mariano Sy

(57) ABSTRACT

A brake system for a running stroller includes a pair of brake devices respectively secured to a pair of rear support rods of the stroller and controlled by a hand lever through a first steel wire, a synchronizer and a pair of second steel wires, when press the hand lever inward the two brake devices are simultaneously functioned to frictionally brake the brake disks on inner side of a pair of rear wheels of the stroller. A tread plate rotatably secured to a distal portion of a rear support rod can arrest the wheels of the stroller from any movement.

6 Claims, 6 Drawing Sheets

BRAKE SYSTEM FOR A RUNNING STROLLER

BACKGROUND OF THE INVENTION

The present invention relates to the stroller and more particularly to a brake system for a running stroller.

As we know that a stroller facilitates the parent to carry his infant to engage in an outdoor activity such as to take walk or shopping in a shopping center. In case of that the parent has to run for something or that the rod is down sloped, it is very dangerous to the infant if there is no brake system in the stroller.

Some of the producers recently produce the running stroller which includes two types, one type likes a pedicab having three bigger wheels and a brake system in the single front wheel. This type of the running stroller has a great disadvantage when the parent urgently presses the brake system, the two rear wheels will be jumped up to cause an overturn. Other type has four bigger wheels and a brake system attached to only one of the two rear wheels. When the parent urgently presses the brake, the running stroller will be swung to cause an accident. So that both this types of running stroller are not safe.

If adopts two brake systems respectively attached to the two rear wheels. The structure must be rather complicated and the parent has to use two hand to simultaneously press the two brakes with same strength, otherwise, the running stroller still be swung.

SUMMARY OF THE PRESENT INVENTION

The present invention has a main object to provide a brake system for a running stroller which has a synchronizer to enable the brake system simultaneously braking two rear wheels with one hand lever and the running stroller keeps stable even if running on a sloped road, and an arrester device to arrest the wheel to completely stop the stroller.

Accordingly, the brake system of the present invention comprises generally two similar brake devices respectively attached to the inner side of the two rear wheels. The brake device each has a second steel wire conjuncted in a synchronizer and controlled by a hand lever through a first steel wire. A pair brake disks respectively and concentrically integrated with the inner side of the rear wheels each having a circumferential flange engageable with a brake pad from a brake lever which is rotatably secured to a support rod of the stroller. When the operator presses the hand lever, the two brake levers simultaneously turn upward and their brake pads respectively engaged with the circumferential flange of the brake disks so as to frictionally slow down the rotation of the wheels or to completely stop the stroller steadily and stably.

The present invention will become more fully understood by reference to the following detailed description thereof when read in conjunction with the attached drawings.

DETAILED DESCRIPTION OF THE PREFERRED EMBODIMENT

Figure 1:
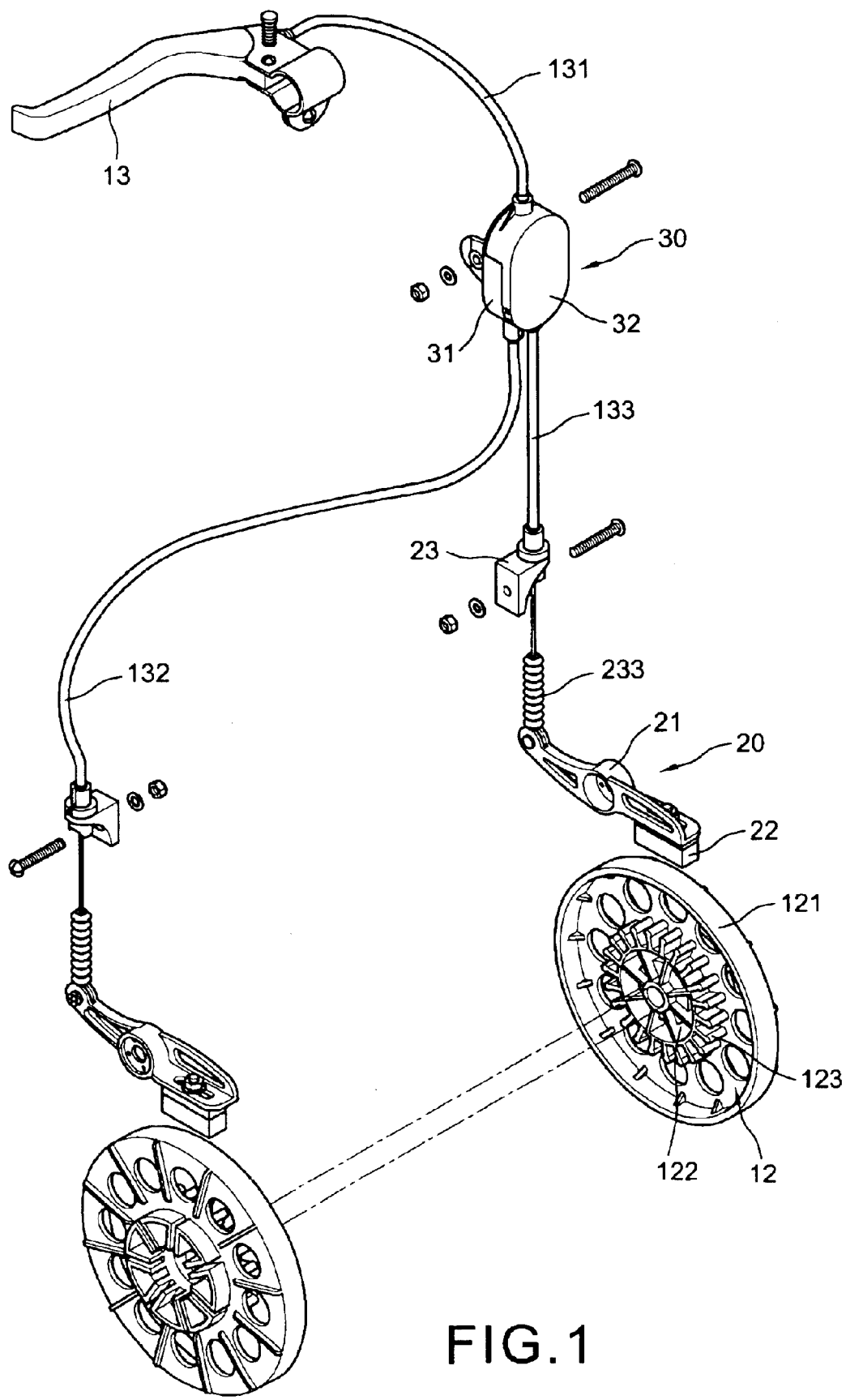
FIG. 1 is a perspective view to show a brake system and a pair of brake disks of the present invention.
Figure 2:
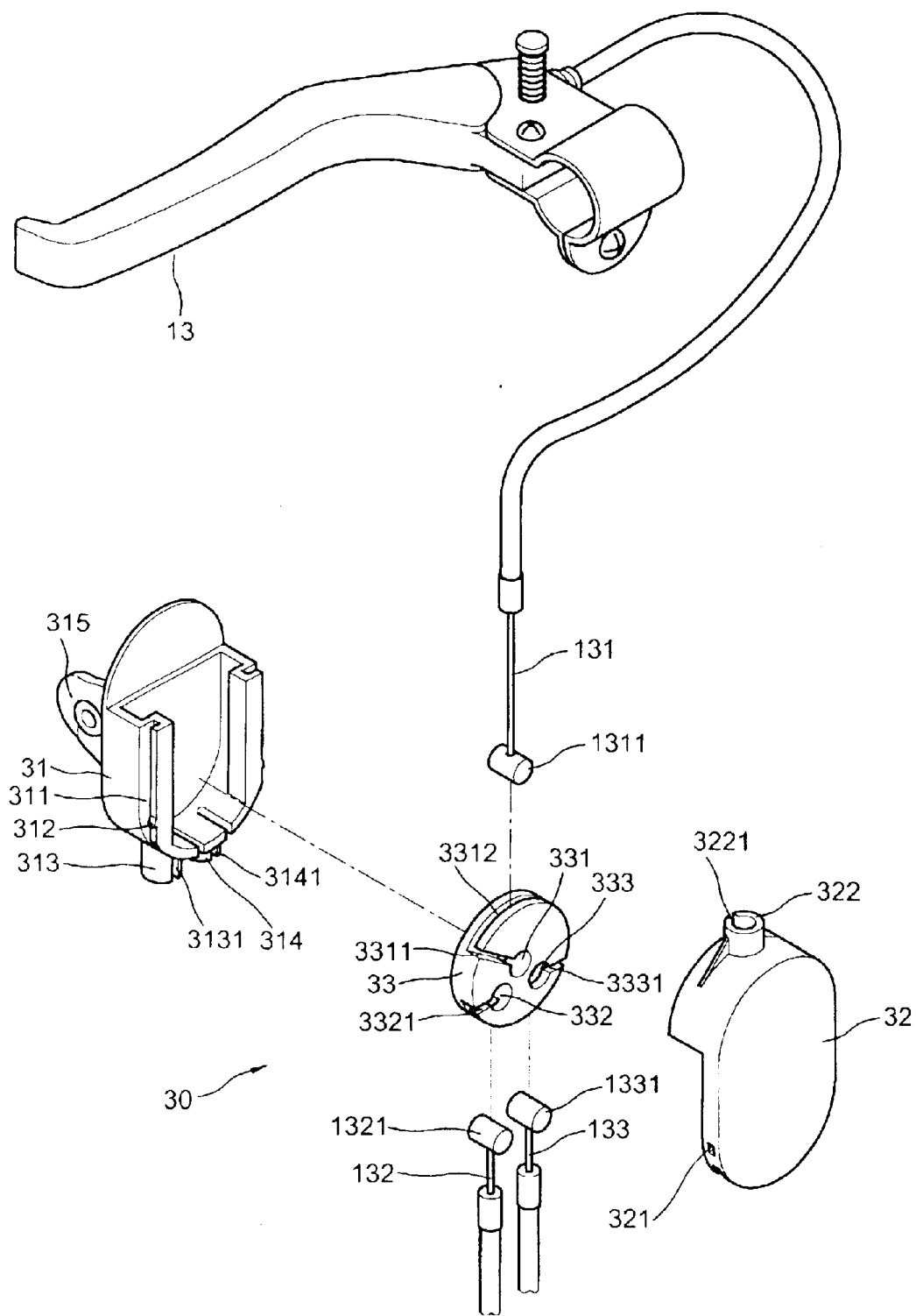
FIG. 2 is an exploded perspective view to show a synchronizer of the present invention.
Figure 3:
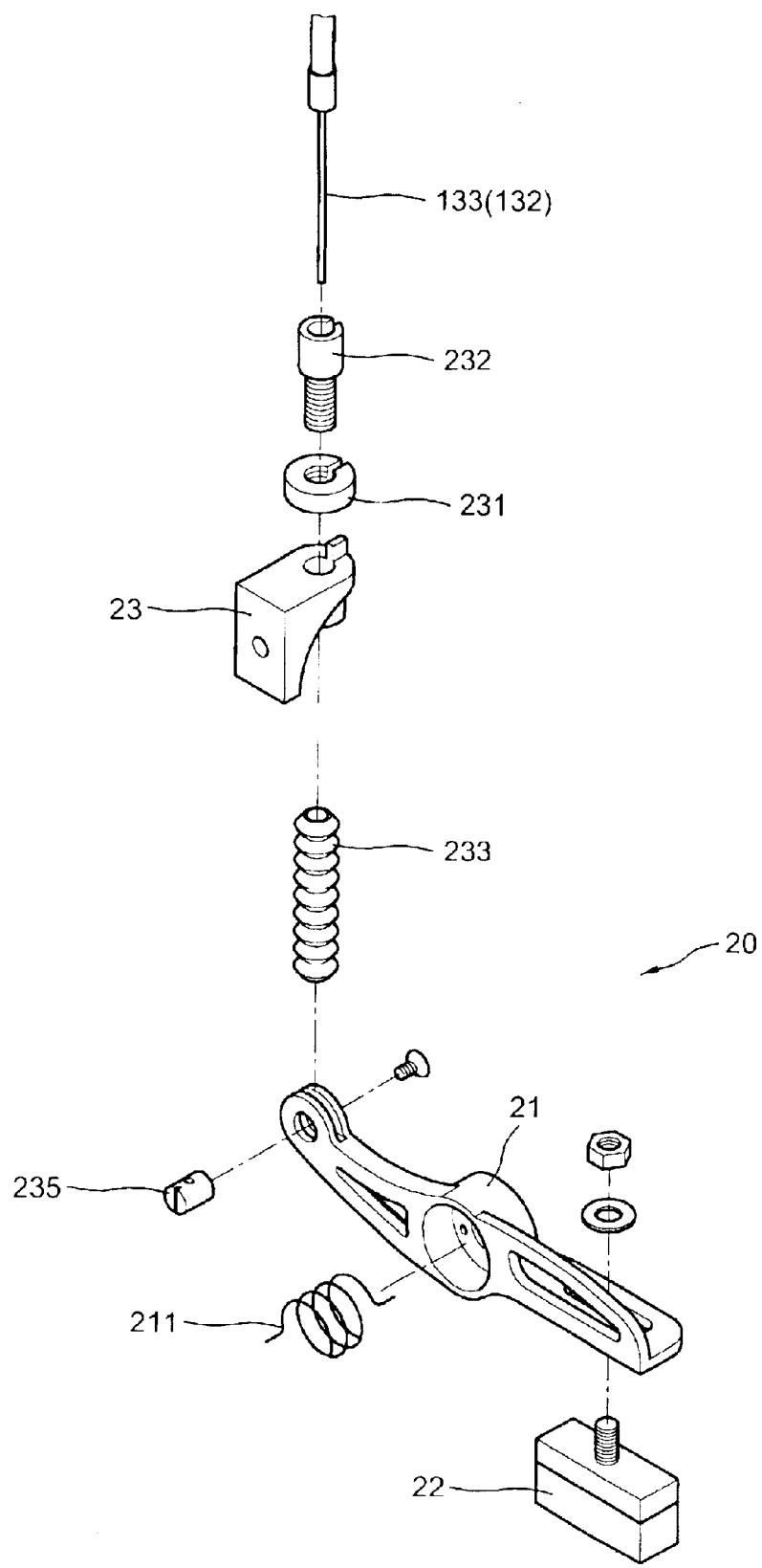
FIG. 3 is an exploded perspective view to show a brake device of the present invention.
Figure 4:
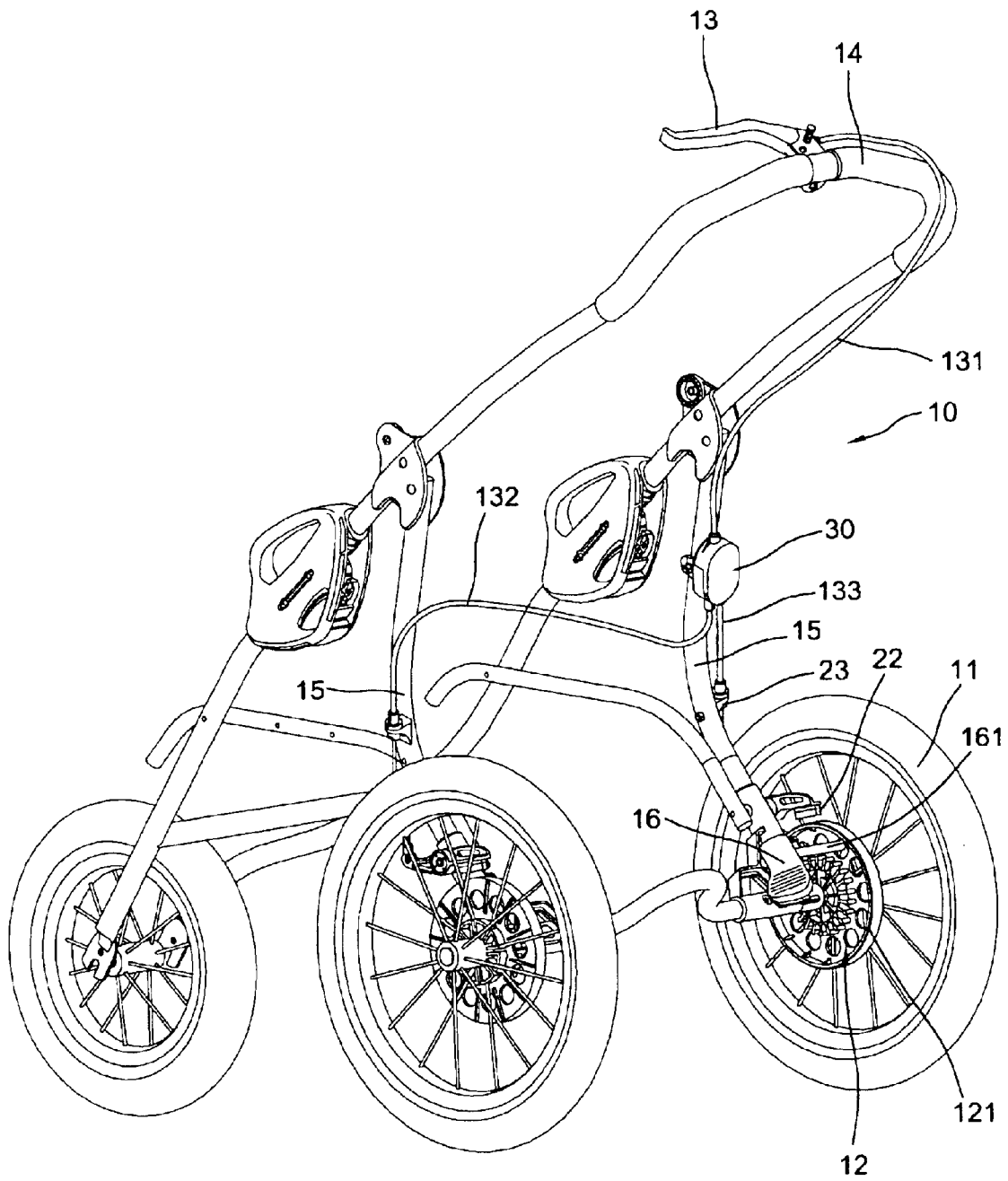
FIG. 4 is a perspectively view of a running stroller combined with the brake system of the present invention.

As illustrated in FIGS. 1, 2, 3 and 4, of the drawings, the brake system for a running stroller of the preferred embodiment of the present invention comprises a pair brake devices 20 respectively attached to the inner side of a pair of rear wheels 11 of a running stroller 10 and controlled by a hand lever 13 on the push handle 14 of the stroller 10 through a synchronizer 30. The hand lever 13 affect a first steel wire 131 from the synchronizer 30 which affects a pair second steel wires 132 and 133 from the brake devices 20. The synchronizer 30 has a pair of half boxes 31 and 32 and a disk 33.

The first half box has a guide 311 in two outer lateral sides including a pair of protrudent, locks symmetrically formed in lower portion a pair of hollow cylinders 313 and 314 spacedly projected downward and communicated into the first half box 31 and each having an axial slit 3131 and 3141 in an inner periphery and a retaining plate 315 on the back side.

The second half box 32 has a pair of retaining holes 321 symmetrically formed in lower portion of a pair of lateral walls engageable with the protrudent locks 312 of the first half box 31 and a hollow cylinder 322 projected upward from the top and communicated to inside of the second half box 32 having an axial slit 3221 in an inner periphery. When slidably engages the second half box 32 with the first half box 31, the protrudent locks 312 will lock the retaining holes 321 in a snap fitting.

The disk 33 is disposed in the synchronizer 30 and has a central retaining hole 331 communicated to a radial slit 3311 and a circumferential slit 3312 which occupies a quadrant of the disk 33, a pair of lower retaining holes 332 and 333 spacedly formed beneath the central retaining hole 331 each having a radial slit 3321 and 3331 communicated to a pair of circumferential slits 3322 and 3332 which also occupy about a quadrant of the disk 33. The first steel wire 131 has an upper end connected to a lateral side of the hand lever 13 and a lower end inserted into the hollow cylinder 322 then to detour the circumferential slit 3312 and the radial slit 3311 and having a cylindrical head 1311 engaged into the central retaining hole 331 of the disk 33.

Figure 5:
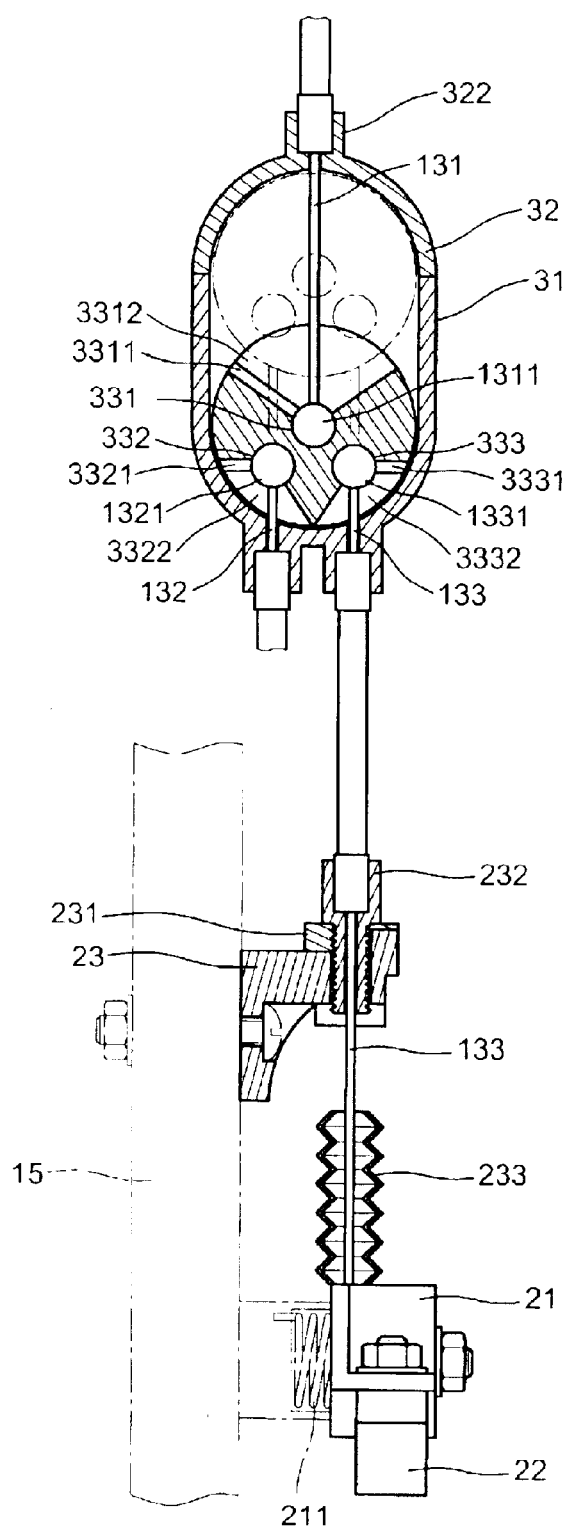
FIG. 5 is a sectional view to show the synchronizer connected to a brake device.

The pair of second steel wires 132 and 133 each has a cylindrical head 1321 and 1331 on upper end respectively engaged into the lower retaining holes 332 and 333 of the disk 33 after that the steel wires 132 and 133 respectively inserted into the hollow cylinders 313 and 314 of the synchronizer 30 and detoured into the circumferential slits 3322 and 3332 and the radial slits 3321 and 3331 of the disk 33 (as shown in FIG. 5).

The retaining plate 315 is adopted to secure the synchronizer 30 to a support rod 15 of the stroller 10.

Figure 6:
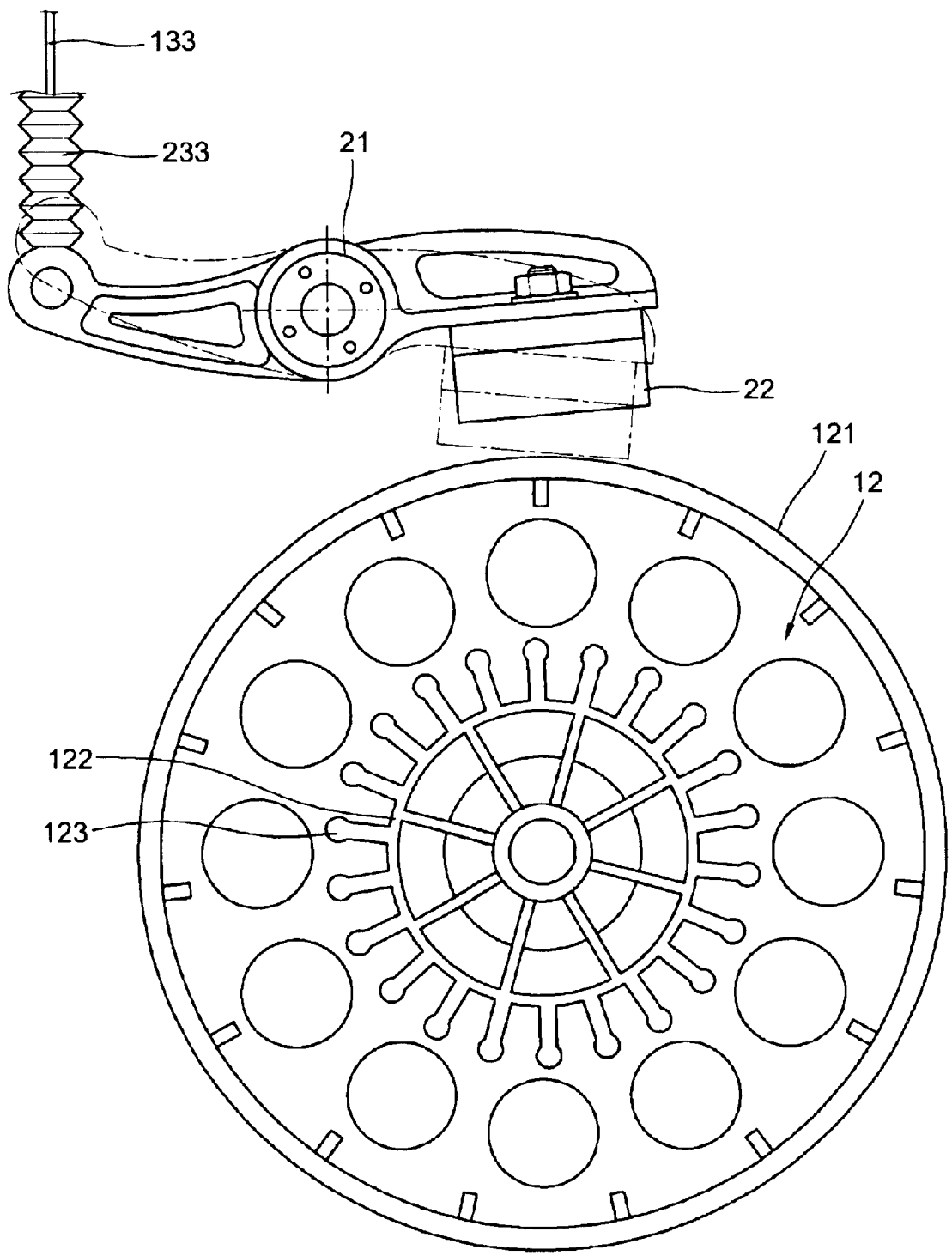
FIG. 6 is a plane view to show the relationship between the brake lever and the brake disk.

The lower ends of the pair of steel wires 132 and 133 each connect to one end of a brake lever 21 through a hollow bolt 232, a slotted ring 231, a positioning means 23 and a bellows rubber tube 233 and secured by a cylindrical retainer 235 and a screws wherein the positioning means 23 is secured to a middle portion of the support rod 15. The brake levers 21 are rotatably secured to a lower portion of the support rods 15 respectively each having a brake pad 22 secured to an underside of the other end above a pair of brake disks 12 and a torque spring 211 disposed into a central bore of the brake lever 21 for urging the brake lever turning back to original position. A pair of brake disks 12 respectively and concentrically integrate with the pair of rear wheels 11 each having a circumferential flange 121 engageable with the brake pad 22, an arrester ring 122 and a plurality of radial arrester plates spacedly formed on the arrester ring 122 (as shown in FIGS. 1 and 6).

A tread plate 16 rotatably secures to the lower end of one of the support rods 15 and has a check rod 161 on a lateral side engageable into the arrester plates 123. The tread plate 16 is normally raising upward.

If the operator wants to stop the stroller, to tread the tread plate 16 downward, the check rod 161 will be immediately inserted into the gap of the arrester plates 123 to hinder the wheels 11 from rotation.

When assembling, first rotatably secure the hand lever 13 to a push handle 14 and secure the retaining plate 315 of the first half box 31 to a middle portion of a support rod 15, then dispose the disk 33 into the first half box 31 and engage the cylindrical head 1311 of the first steel wire 131 into the central retaining hole 331 with the steel wire 131 detoured into the radial slit 3311, the circumferential slit 3312 and capable of engaginq within the slit 3221 of the hollow cylinder 322 of the second half box 32 and respectively engage the cylindrical heads 1321 and 1331 of the pair of second wires 132 and 133 into the retaining holes 332 and 333 and then respectively detour the second wires 132 and 133 into the radial slit 3321 and 3331, the circumferential slit 3322 and 3332 and the slit 3131 of the hollow cylinder 313 and the slit 3141 of the hollow cylinder 314. Finally slidably engage the second half box 32 with the first half box 31 through the guide 311 with the retaining hole 321 engaged with the protrudent lock 312 in a snap fitting (as shown in FIG. 5).

The pair of the hollow bolts 232, the pair of slotted rings 231, the pair of positioning means 23 and the pair of the bellows rubber tubes 233 respectively and sequentially wrap to the lower end of the pair of second steel wires 132 and 133 with the positioning means 23 secured to a lower end of the support rods 15, the hollow bolts 232 screwed into the positioning means with the slotted rings 231 engaged therebetween and the bellows rubber tubes 233 positioned abutting the lower end of the second steel wires respectively.

The lower end of the second steel wires 132 and 133 are respectively secured to one end of the pair of brake levers 21 by a pair of cylindrical retainers and a pair of screws.

The brake levers 21 are respectively and rotatably secured to a lower end of the pair of support rods 15 having a pair of torque springs 211 engaged therebetween and a pair of brake pads 22 respectively secured to the underside of the other end of the brake levers 21.

Upon the above arrangement, when the parent push the stroller 10 to run forward, the stroller 10 will keep balanced and stable.

The infant in the stroller 10 will be comfortable. When the parent want to slow down the stroller especially on a sloped rod, he or she can press the hand lever 13 inward with the thumb such that the first steel wire 131 through the synchronizer 30 simultaneously drag the two second steel wires upward to raise the rear end of the brake levers 21 to cause the brake pad 22 under fore end of the brake lever 21 moving down to engage with the circumferential flange 121 of the brake disk 12 so as to obtain the slow down of the stroller 10.

If parent want to stop the stroller 10 for long period of time, treads the tread plate 16 downward, the brake disk will be arrested by the check rod 161 of the tread plate 16 and the wheels of the stroller 10 are naturally stopped from moving.

The brake system for the running stroller 10 of the present invention can simultaneously brake the pair of rear wheels 11 that is superior to the above discussed prior arts which have a brake system only brakes one of the three or four wheels. The disadvantages of the prior art such as to cause the stroller overturn or to swing around is therefore eliminated by the present invention.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A brake system for a running stroller comprising:
a brake system combined with a running stroller which has a pair of fore support rods, a pair of rear support rods, a push handle above the rear support rods, a pair of fore wheels and a pair of rear wheels, said brake system comprising a pair of identical brake devices attached to a lower end of the pair of rear support rods respectively and controlled by a hand lever which is rotatably secured to said push handle through a first steel wire, a synchronizer secured to a middle portion of a rear support rod and having a pair of second steel wires, said first wire having an upper end connected with one lateral side of said hand lever and a first cylindrical head on lower end, said second steel wires each having a second cylindrical head on upper end and a lower end thereof respectively inserted through a hollow bolt, a slotted ring, a positioning means which secured to a lower portion of said pair of rear support rods and a bellows rubber tube sequentially, wherein the hollow bolt is screwed into the positioning means with the slotted ring engaged therebetween, a pair of brake levers rotatably and respectively secured to a lower end of said pair of rear support rods each having a central bore to receive a torque spring therein, a rear end connected to the lower end of the pair of second steel wires and secured by a cylindrical retainer and a screw and a fore end connected a brake pad on underside, a pair of brake disks concentrically and respectively integrated with the pair of rear wheels each having a circumferential flange engageable with the brake pads of the brake levers, an arrester ring concentrically formed on center and plurality of arrester plates spacedly and radially projected outward from the arrester ring and a tread plate rotatably secured to a lower end of one of the rear support rods having a check rod enaageable into the arrester plates of said brake disks;
whereby press the hand lever inward, the two brake devices will simultaneously brake the pair of rear wheels and tread the tread plate downward, the wheels will be arrested from any movement.

2. The brake system as recited in claim 1 wherein said synchronizer is comprised of a first half box, a second half box combined with first half box and a disk inside combined box.

3. The brake system as recited in claim 2 wherein said first half box has a pair of guides in outer surface including a pair of protrudent locks symmetrically formed in lower portion of said guides, a pair of hollow cylinders spacedly projected downward and communicated into said first half box each having an axial slit in an inner periphery for permitting the upper end of said pair of second steel wires inserted into said first half box and a retaining plate on a back side for securing said synchronizer to a rear support rod.

4. The brake system as recited in claim 2 wherein said second half box has a pair of retaining holes symmetrically formed in lower portion of a pair of lateral walls engaged with the protrudent locks of said first half box in a snap fitting and a hollow cylinder projected upward from a top communicating to inside thereof having an axial slit in an inner periphery to permit lower end of said first steel wire inserting into said second half box.

5. The brake system as recited in claim 2 wherein said disk has a central retaining hole communicating to a first radial slit and a first circumferential slit to engage a first cylindrical head and the first steel wire which detours into the first radial slit of the first circumferential slit, a pair of lower retaining holes spacedly formed beneath said central retaining hole each communicating to a second radial slit and a second circumferential slit to engage with a pair of second cylindrical heads of said pair of second steel wires which detour into said second radial slits and said second circumferential slits respectively.

6. The brake system as recited in claim 5 wherein said circumferential slit each occupies a quadrant of said disk.

\* \* \* \* \*